(12) United States Patent
Glasl et al.

(10) Patent No.: US 7,798,567 B2
(45) Date of Patent: Sep. 21, 2010

(54) VEHICLE ROOF COMPRISING A MOVABLE COVER AND AN OPENABLE BLIND DISPOSED THEREUNDER

(75) Inventors: Sebastian Glasl, Viernheim (DE); Andreas Rockelmann, Munich (DE); Christian Adlhoch, Munich (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 12/298,399

(22) PCT Filed: Apr. 24, 2007

(86) PCT No.: PCT/DE2007/000721
§ 371 (c)(1),
(2), (4) Date: Feb. 9, 2009

(87) PCT Pub. No.: WO2007/121734
PCT Pub. Date: Nov. 1, 2007

(65) Prior Publication Data
US 2009/0212604 A1 Aug. 27, 2009

(30) Foreign Application Priority Data
Apr. 24, 2006 (DE) ........................ 10 2006 019 322

(51) Int. Cl.
*B60J 7/00* (2006.01)
*B60J 3/02* (2006.01)
(52) U.S. Cl. ...................................... 296/214; 160/265
(58) Field of Classification Search ................. 296/214; 160/265
See application file for complete search history.

(56) References Cited

U.S. PATENT DOCUMENTS

| | | | | |
|---|---|---|---|---|
| 5,253,451 A | * | 10/1993 | Hormann | ...................... 49/139 |
| 6,416,103 B1 | * | 7/2002 | Laudenbach et al. | ........ 296/37.1 |
| 6,634,703 B1 | * | 10/2003 | De Gaillard | ................. 296/214 |
| 6,848,493 B1 | * | 2/2005 | Hansen et al. | .......... 160/370.22 |
| 7,314,079 B2 | * | 1/2008 | Yano et al. | .............. 160/370.22 |
| 2002/0041113 A1 | * | 4/2002 | Hori et al. | .................... 296/214 |

FOREIGN PATENT DOCUMENTS

DE       4203229        8/1993

(Continued)

OTHER PUBLICATIONS

International Search Report dated Dec. 14, 2007.

*Primary Examiner*—Dennis H Pedder
(74) *Attorney, Agent, or Firm*—Fitch, Even, Tabin & Flannery; John M. Naber

(57) ABSTRACT

The invention relates to a vehicle roof (10) comprising at least one at least partially transparent roof part (14) that can be moved in order to at least partly open a roof opening (17), and a blind (20) which allows the movable roof part (14) to be covered from below at least in the closed position of the roof part (14). Said blind (20) is equipped with a blind web (22), an extensible hoop that is arranged at the front edge of the blind web (22), and a blind shaft (26) for winding up the blind web (22). The extensible hoop (24) is coupled to an electric driving motor via a dog so as to displace the extensible hoop along a guide. In order to make the vehicle roof more comfortable to operate, the extensible hoop (24) is removably coupled to a dog which is connected to the driving motor such that the blind (20) can be operated with the aid of the driving motor and can be displaced manually without being coupled to the driving motor.

7 Claims, 2 Drawing Sheets

FOREIGN PATENT DOCUMENTS

| | | |
|---|---|---|
| DE | 199 02534 | 1/2000 |
| DE | 100 63150 | 7/2001 |
| EP | 100 6012 | 6/2000 |
| EP | 123 8840 | 9/2002 |
| WO | WO O194 139 | 12/2001 |

* cited by examiner

VEHICLE ROOF COMPRISING A MOVABLE COVER AND AN OPENABLE BLIND DISPOSED THEREUNDER

This application is a 35 U.S.C. §371 National Stage entry of PCT/DE2007/000721, filed Apr. 24, 2007, which claims priority from German Patent Application No.: 10 2006 019 322.9, filed Apr. 24, 2006, the contents of which are herein incorporated by reference.

The invention relates to a vehicle roof comprising a movable cover and an openable roller blind disposed thereunder, according to the preamble of patent claim 1.

A vehicle roof of the type in question is known from the Peugeot 1007, in which a roller blind is connected by its front edge to a transparent cover. When the cover is moved rearwardly to uncover a roof opening, the roller blind curtain is rolled up onto a roller blind shaft which is mounted on a rear roof part.

The Renault Megane hardtop convertible makes known a solution in which a roller blind can have its front edge hooked into place on a frame part extending transversely between the A-pillars. The frame part is a constituent part of the collapsible convertible roof, which means that the roller blind is opened automatically with the convertible roof when the latter is opened.

If a hardtop convertible is provided with a separately openable roof part (see, for example, DE 42 03 229 C2), this roof part must be able to be moved very far rearwardly. Attaching the roller blind to the sliding roof mechanism (as in the case of the Peugeot 1007) is not possible here for reasons of space.

The object on which the invention is based is to provide a vehicle roof in which the operating comfort and variation possibilities are improved.

This object is achieved according to the invention by the features of patent claim 1. Advantageous developments of the invention are given in the subclaims.

In essence, the invention provides that, on the one hand, the roller blind can be actuated by means of an electric drive but, on the other hand, can also be uncoupled from a driver connected to the electric drive in order to be able to be actuated manually.

According to a particularly advantageous embodiment, the same drive motor is used for driving the movable roof part as for driving the roller blind. This makes it possible to save on one drive motor. When opening the movable roof part, the roller blind is likewise intended to be moved into an opening position anyway to avoid any flapping of the roller blind curtain, and therefore a synchronous movement by means of a single drive can be achieved easily.

According to a further advantageous embodiment, provision is made for the driver coupled to the electric drive to have a latching lug in which a latching hook connected to the pull-out bow engages. Uncoupling of the pull-out bow is advantageously initiated by a lifting and/or tilting movement of a handle piece provided on the pull-out bow.

A vehicle roof according to the invention will be explained in more detail below with reference to the drawing, in which.

Figure 8:
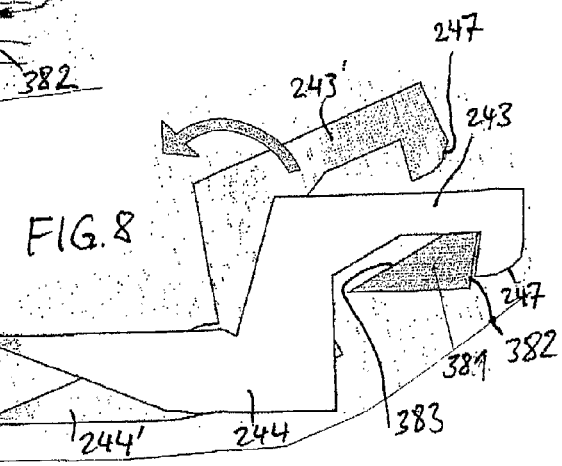
Figure 9:
Figure 10:
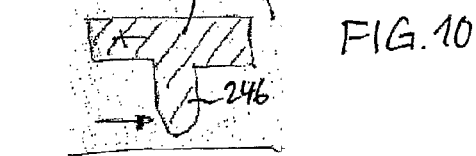

FIGS. 7a-c show a schematic partial longitudinal section through a lateral longitudinal guide of a roller blind, with the driver and the latching device in three different positions;

FIG. 8 shows a detail view of a latching hook and the driver;

FIG. 9 shows a cross section through the pull-out bow in the region of a handle recess; and FIG. 10 shows a variant of FIG. 9 with a handle strip.

Figure 1:
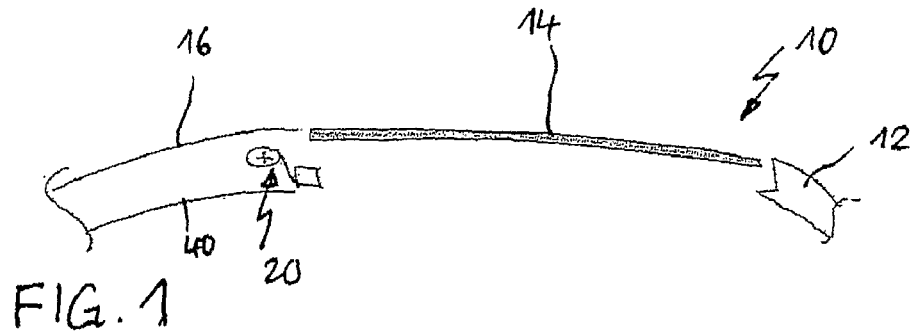
FIG. 1 shows a schematic longitudinal section through a vehicle roof when the movable roof part is closed and the roller blind is opened.
Figure 2:
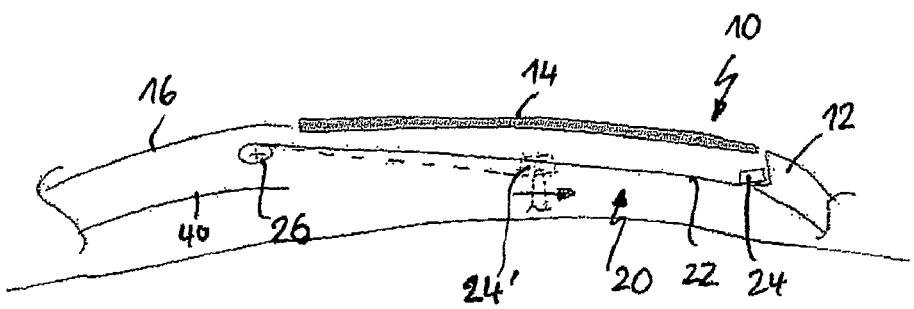
FIG. 2 shows the vehicle roof according to FIG. 1 with the roller blind closed or partially opened.
Figure 3:
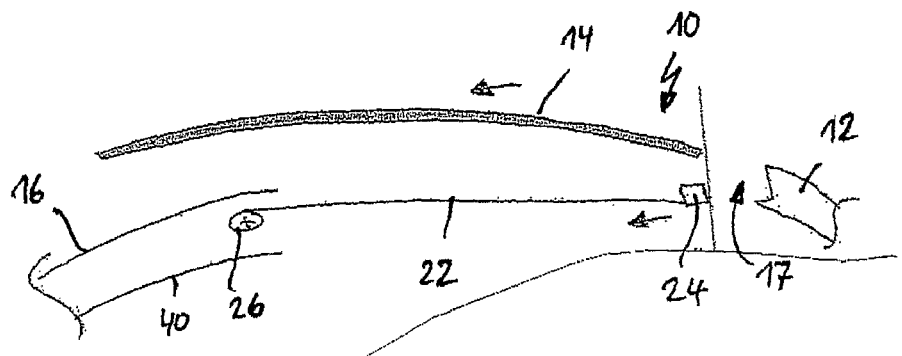
FIG. 3 shows the vehicle roof according to FIG. 2 with the movable roof part partially opened.
Figure 4:
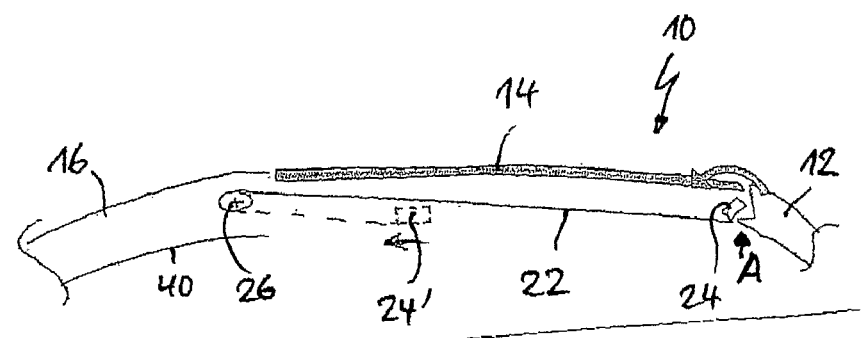
FIG. 4 shows the vehicle roof according to FIG. 2 with the roller blind closed when the pull-out bow is uncoupled.

The vehicle roof 10 shown in FIG. 1 is composed of a movable roof part 14, preferably designed as a transparent cover, whose front edge adjoins a cowl 12 bounding the upper edge of a front window, and of a roof part 16 which adjoins a rear edge of the movable roof part 14 and which, in the exemplary embodiment, is formed by an intermittently fixed rear roof part of a hardtop convertible roof which can be moved as a whole into a stowage space (not shown). The movable roof part 14 is guided in a longitudinally displaceable manner along a guide by way of a front slider 141 on both sides and a rear slider 142 on both sides.

Figure 5:
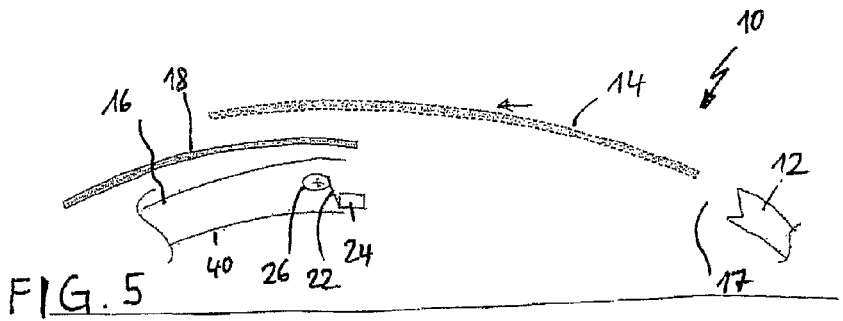
FIG. 5 shows the vehicle roof according to FIG. 3 with the roller blind completely opened.
Figure 6:
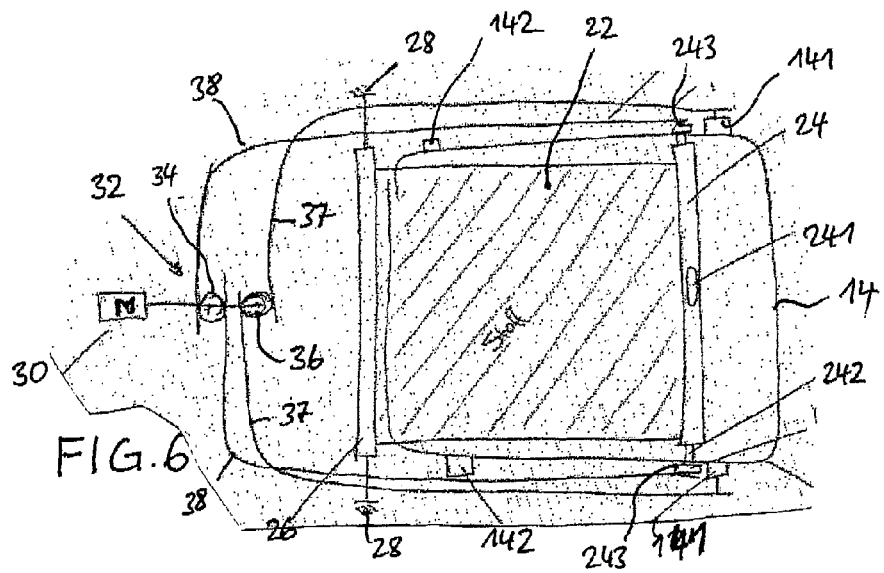
FIG. 6 shows a schematic plan view of the vehicle roof according to FIGS. 1 to 5.

The movable roof part 14 can be lifted by its rear edge and displaced over the rear roof part 16. In so doing, it at least partially uncovers a roof opening 17 which is bounded at the front edge by the cowl 12 and at the rear edge by the rear roof part 16. Optionally, a rear window 18 (see FIG. 5) adjoining the rear roof part 16 can also be displaced in a forward direction over the rear roof part 16 in order thereby to uncover an additional ventilation opening in the rear part of the vehicle. The partial or complete opening of the movable roof part 14 is designed to constitute an operating position in the present vehicle. In other words, apart from the closed state, the vehicle roof 10 can be operated not only to have a relatively small roof opening 17 which can be opened up in the manner of a sliding roof but also to have a convertible opening which completely opens up the vehicle interior to the top, this convertible opening being uncovered by moving the intermittently fixed rear roof part 16 together with the movable roof part 14 and the rear window 18 into a stowage space (not shown) in the rear region of the vehicle.

To protect the vehicle interior from excessive sun exposure, a roller blind 20 is arranged beneath the movable roof part 14. This roller blind is composed of a roller blind curtain 22 made of a flexible textile material or a plastic material, a pull-out bow 24 fastened to the front end of the roller blind curtain 22, and a roller blind shaft 26 which is mounted beneath the front edge of the rear roof part 16 and onto which the roller blind curtain 22 can be completely wound up (see FIGS. 1 and 5).

The pull-out bow 24 has a handle piece 241 which is provided on its underside facing the vehicle interior with a handle recess 245 (FIG. 9) or a handle strip 246 (FIG. 10). On both sides of the roof opening 17, the pull-out bow 24 is mounted on a lateral guide 19 (see FIG. 7) in a longitudinally displaceable manner by means of a respective sliding piece 244. The sliding piece 244 is provided on its lower surface in the rear region with a beveled, rearwardly rising guide surface 244'. The sliding piece 244 is connected in its front region to a latching hook 243 which extends forwardly in the form of a hook. The latching hook 243 is provided at its front edge in the lower region with a run-on bevel 247.

In the region of the front sliders 141, the movable roof part 14 is connected by means of drive cables 37, which are guided in correspondingly formed channels of the guides in a tension- and compression-resistant manner, to a pinion 36 which can be driven by an electric drive motor 30 via a gear unit 32.

The drive motor 30, the gear unit 32 and the pinion 36 are mounted on the rear roof part 16. Like the roller blind shaft 26, they are covered to the bottom by a fixed headliner 40 connected to the rear roof part 16. The gear unit 32 comprises a further pinion 34 which can be driven synchronously to the pinion 36 and which, via drive cables 38 guided in a tension- and compression-resistant manner, is connected to a respective driver 381 which is guided close to the front slider 141 in a longitudinally displaceable manner along the guides 19 when the roof part 14 is closed. The driver 381 is provided on its forwardly directed surface with a latching lug 382. On its rear side, the driver 381 forms a rearwardly sloping run-up ramp 383.

Figure 7:
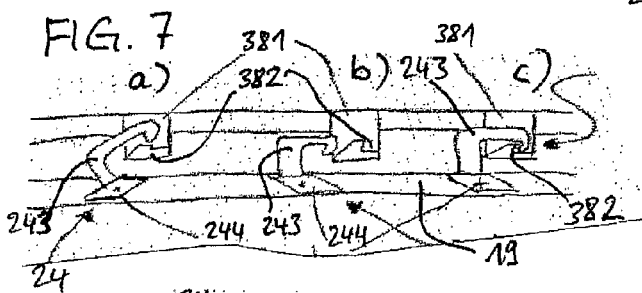

As can be seen from FIGS. 7 and 8, in a first coupled operating position the latching hook 243 connected to the pull-out bow 24 engages around the latching lug 382 on the driver 381. In this position, the front pull-out bow 24 of the roller blind 20 is coupled to the drive motor 30 via the driver 381 and the drive cable 38. Since the drive motor 30 also serves to actuate the movable roof part 14, the pull-out bow 24 is moved synchronously to and along with the movable roof part 14 in the rearward direction during an opening movement of said roof part, with the roller blind curtain 22 being rolled up at the same time onto the roller blind shaft 26 with spring loading.

If it is wished to let more light into the vehicle interior when the roof part 14 is closed, it is possible by lifting the handle piece 241 on the pull-out bow 24 to cause a rearward and upward tilting movement of the latching hook 243. The tilting movement is depicted by arrows in FIGS. 4 and 8 to 10. Here, the latching hook 243 passes into the position designated by 243' in FIG. 8, in which position it comes out of engagement with the latching lug 382 of the driver 381. At the same time, the rear beveled guide surface 244' is placed against the guide 19. In this second operating position, the pull-out bow 24 can be manually guided rearwardly along the guide 19 such that the roller blind 20 can be transferred to its opened position when the roof part 14 is closed.

During a subsequent opening movement of the movable roof part 14, the driver 381, as a result of the synchronous movement of the drive cables 37 and 38, is moved rearwardly at the same time with the front slider 141. In so doing, as represented in FIG. 7b, the run-up ramp 383 runs against the run-on bevel 247, with the result that the latching hook 243 tilts upwardly and then passes automatically once more into its first operating position in which it is locked with the latching lug 382 on the driver 381. During a subsequent closing movement of the movable roof part 14, the roller blind 20 is consequently taken automatically along again into its closing position.

Of course, the manually opened roller blind can also be returned manually to its closing position. Sliding the pull-out bow 24 forward thus causes the latching hook 243 in the front end position to pass automatically again into engagement with the driver 381.

If required, the roller blind 20 can optionally be opened and closed manually even when the roof part 14 is partially opened. Since the driver 381 is always positioned just behind the front edge of the movable roof part 14 as a result of the synchronous movement of the drive cables 37 and 38, a partially closed roller blind 20 is always situated below the partially opened roof part 14, which means that any flapping of the roller blind curtain 22 is eliminated to the largest possible extent.

The invention provides a simple possibility of increasing the operating comfort and the number of opening variants of a roller blind. Particularly when used below a movable roof part of a hardtop convertible, it is advantageous for the roller blind to be able to be actuated by means of the same drive which also drives the movable roof part. As a result, savings can be made at the rear roof part 16 both in terms of valuable installation space and weight which would be required for a separate drive of the roller blind.

The invention claimed is:

1. A vehicle roof with at least one at least partially transparent roof part which can be moved so as to at least partially uncover a roof opening, and with a roller blind by means of which the movable roof part can be covered from below, at least when it is in its closed position, said roller blind comprising a roller blind curtain, a pull-out bow arranged on the front edge of said curtain, and a roller blind shaft for winding up the roller blind curtain, wherein the pull-out bow is coupled via a driver to an electric drive motor in order to move the pull-out bow along a guide, wherein the pull-out bow is releasably coupled to a driver connected to the drive motor, with the result that it is possible both for the roller blind to be operated by means of the drive motor and for the roller blind to be displaced manually while being uncoupled from the drive motor; and wherein the uncoupling of the pull-out bow is initiated by a lifting and/or tilting movement of a handle piece provided on the pull-out bow.

2. The vehicle roof of claim 1, wherein the same drive motor is used for driving the movable roof part as for driving the roller blind.

3. The vehicle roof of claim 1, wherein the driver has a latching lug in which a latching hook connected to the pull-out bow engages.

4. The vehicle roof of claim 1, wherein the coupling between driver and pull-out bow is configured such that coupling takes place automatically during a relative movement of the two parts.

5. The vehicle roof of claim 4, wherein the driver has a rearwardly sloping run-up ramp which interacts with a run-on bevel on a locking member of the pull-out bow.

6. The vehicle roof of claim 1, wherein the movable roof part can be moved over an intermittently fixed roof part which is arranged behind it and under whose front edge the roller blind shaft is arranged.

7. The vehicle roof of claim 1, characterized in that the pull-out bow of the roller blind can be moved synchronously with the front edge of the movable roof part.

* * * * *